United States Patent [19]

Tay

[11] 4,374,218

[45] Feb. 15, 1983

[54] RESILIENT SEALING COMPOSITIONS

[75] Inventor: Kay-Kiong Tay, Erie, Pa.

[73] Assignee: Lord Corporation, Erie, Pa.

[21] Appl. No.: 352,510

[22] Filed: Feb. 25, 1982

[51] Int. Cl.³ .......................... C08K 3/22; C08K 5/04; C08K 5/09; C08K 5/17

[52] U.S. Cl. ........................................ 524/86; 524/322; 524/432; 524/526; 524/534; 524/254; 524/255

[58] Field of Search ................. 524/86, 322, 432, 526, 524/534, 254, 255

[56] References Cited

U.S. PATENT DOCUMENTS 3,945,977  3/1976  Snavely ............................... 524/534
4,247,664  1/1981  Parker ................................... 524/86
4,326,062  4/1982  Kojima et al. ......................... 524/86

FOREIGN PATENT DOCUMENTS 48-14426   5/1973  Japan .................................... 524/526
56-109234  8/1981  Japan .................................... 524/526
729213     4/1980  U.S.S.R. ............................... 524/526

*Primary Examiner*—Ronald W. Griffin
*Attorney, Agent, or Firm*—John A. Gazewood

[57] ABSTRACT

Rubber compositions are disclosed which exhibit a combination of properties especially suited for use as fluid sealing elements, such as valve seals, piston seals, washers and faucet seats.

2 Claims, No Drawings

RESILIENT SEALING COMPOSITIONS

FIELD OF THE INVENTION

This invention relates to resilient sealing compositions. More particularly, the invention relates to natural and synthetic rubber compositions which are adapted for use in fluid sealing applications, such as valve and piston seals and faucet seats and washers.

Natural and synthetic elastomers are a well-known class of materials which are widely used in an enormous number of engineering needs in fields dealing with shock, noise and vibration control, sealing, corrosion protection, abrasion protection, friction production, electrical and thermal insulation, waterproofing, confining other materials, and load bearing.

In selecting an elastomeric material for a given application, a number of things must be considered, and almost any choice becomes a compromise. As in any material-selection problem, the considerations include mechanical or physical service requirements, operating environment, a reasonable life cycle, satisfactory size and proportions of the part to do the job, manufacturability of the part, and the cost. In addition, within the framework of each family of elastomeric materials, there exists a wide range of available properties. These are made possible by compounding; that is, incorporating additives that improve a weak property, make the compound easier to process, or reduce cost, without significantly affecting desired properties. In addition to the varieties of rubbers available, almost any physical or chemical property can be altered to some extent. Thus, selecting the best elastomeric materials and the correct balance of compounding additives for a given application can involve considerable investigation.

The present invention discloses an elastomeric composition which is characterized by a high modulus, low compression set, low stress relaxation, high resilient, high abrasion resistance, high thermal stability and high water resistance. This beneficial combination of properties is especially adapted to use in fluid sealing applications, such as O-rings, washers, and faucet seats and provides a high service life when used in such applications.

More particularly, the elastomeric compositions of this invention comprise from 69 to 81, preferably 72 to 78, parts by weight of at least one elastomeric homopolymer of 1,3-butadiene; 100-x, wherein x is the amount of 1,3-butadiene homopolymer, parts by weight of at least 1 elastomeric copolymer of styrene and 1,3-butadiene; from 2 to 10, preferably 3 to 7, parts by weight of zinc oxide; from 100 to 120, preferably 105 to 112, parts by weight of carbon black, such carbon black consisting of "a" percent by weight of at least one high abrasion furnace black, "b" percent by weight of at least one semi-reinforcing furnace/high modulus black and "c" percent by weight of at least one medium thermal black; from 2 to 30, preferably 5 to 20, parts by weight of at least one methacrylic monomeric compound having at least 2, preferably at least 3, polymerizable methacrylate groups; from 0.1 to 10, preferably 1 to 5, parts by weight of at least one organic peroxide; from 0.1 to 5, preferably 0.5 to 1.5, parts by weight of "d"; and 0.1 to 10, preferably 1 to 5, parts by weight of at least one antioxidant, antiozonant or mixture thereof.

"a" = 25 to 32, preferably 27 to 29,
"b" = 27 to 35, preferably 29 to 32,
"c" = 37 to 46, preferably 39 to 43,
"d" = at least one organic activator;

Methacrylic monomeric compounds which are suitable for use in the practice of the invention are characterized by the presence of at least two, preferably at least three, polymerizable methacrylate groups. Representative polyfunctional methacrylic monomeric compounds include 1,3-butylene glycol dimethacrylate; ethylene glycol dimethacrylate; 1,4-butylene glycol dimethacrylate; polyethylene glycol dimethacrylate; trimethylolpropane trimethacrylate; pentaerythritol tetramethacrylate; glycerol trimethacrylate and trimethylolethane trimethacrylate. Currently, the use of triomethylolpropane trimethacrylate is preferred.

Representative peroxide compounds which can be utilized in the practice of the invention include, without limitation thereto, di-t-butyl peroxide; di-t-amyl peroxide; 2,2-di-(t-butyl peroxy) butane; di-($\alpha,\alpha$-dimethyl benzyl) peroxide, known as dicumyl peroxide; di-($\alpha,\alpha$-dimethyl-p-chlorobenzyl) peroxide; di-($\alpha,\alpha$-dimethyl-2,4-dichlorobenzyl) peroxide; and t-butyl-l-methylcyclohexyl peroxide.

Organic activator compounds which can be employed in the practice of the invention are preferably selected from the group consisting of saturated and unsaturated carboxylic acids having from 6 to 24 carbon atoms, including stearic, palmitic, lauric, caproic, oleic, capric, myristic and behenic acids; coconut, fish oil, cottonseed and corn fatty acids; and their amine, zinc, sodium, copper, chromium, cobalt, nickel, magnesium, manganese and iron salts. Stearic acid is currently preferred.

Substantially any of the antioxidants and antiozonants which are conventionally employed in the rubber industry to protect elastomeric materials from the degradative effects of oxygen and ozone may be employed in the practice of this invention. An extensive listing of such material can be found in "Materials and Compounding Ingredients for Rubber"; *Rubber World*; Bill Publications, Inc.,; 630 Third Ave; New York, N.Y. 10017; 1968; Pages 97–128.

The compositions of the invention are easily prepared by conventional rubber compounding techniques in known equipment, such as with kneading by means of an open mill or internal mixer. The compositions are easily processed into the desired shape employing conventional injection molding, compression molding, extruding and calendering equipment. Curing is effected at conventional temperatures of 145° C. to 210° C. at times of 30 seconds to 120 minutes.

EXAMPLE 1

The following composition was prepared; all amounts are in parts by weight:

| Ingredients | Amount, PBW |
| --- | --- |
| Poly(1,3-butadiene) elastomer | 75 |
| Poly(1,3-butadiene) styrene elastomer | 25 |
| Zinc oxide | 5 |
| Stearic acid | 1 |
| High abrasion furnace carbon black | 30 |
| Semi-reinforcing furnace/high modulus carbon black | 33 |
| Medium thermal carbon black | 45 |
| Trimethylolpropane trimethylacrylate | 15 |
| Dicumyl peroxide | 1.1 |
| N,N'—di-$\beta$-naphthyl-p-phenylenediamine | 1 |
| Poly(1,2-dihydro-2,2,4-trimethylquinoline) | 2 |

The composition was employed to form faucet seats by injection molding with a cure cycle of 5 minutes at 173° C. The molded parts give the following stress-strain properties:

| Tensile Strength | 11.7 mPa |
|---|---|
| Elongation at Break | 50% |
| Shore A Hardness | 83/85 |
| Compression Set | 22 hr/70° C.: 11.5%; |
| | 22 hr/100° C.: 13.3% |
| Tear Strength | 21 kN/m |

The molded faucet seats were coated with a polytetrafluoroethylene coating, seated in a water faucet and then subjected to continuous flexing with a hot water flow staged at various temperature levels from 65° C. to 82° C. The faucet seats did not fail upon being flexed through 100,000 cycles.

What is claimed is:

1. A composition of matter comprising
   (a) from 69 to 81 parts by weight of at least one elastomeric homopolymer of 1,3-butadiene;
   (b) 100−x, wherein x is the amount, in parts by weight, of said elastomeric homopolymer of 1,3-butadiene, of at least one copolymer of styrene and 1,3-butadiene;
   (c) from 2 to 10 parts by weight of zinc oxide;
   (d) from 100 to 120 parts by weight of carbon black, such carbon black consisting of 25–32 percent by weight of at least one high abrasion furnace black, 27–35 percent by weight of at least one semi-reinforcing furnace/high modulus black, and 37–46 percent by weight of at least one medium thermal black;
   (e) from 2 to 30 parts by weight of at least one polymerizable methacrylic monomer having at least two polymerizable methacrylate groups;
   (f) from 0.1 to 10 parts by weight of at least one organic peroxide;
   (g) from 0.1 to 5 parts by weight of stearic acid; and
   (h) from 0.1 to 10 parts by weight of at least one compound selected from the group consisting of antioxidants and antiozanants.

2. A composition according to claim 1 comprising
   (a) 75 parts by weight of poly(1,3-butadiene);
   (b) 25 parts by weight of poly(1,3-butadiene/styrene);
   (c) 5 parts by weight of zinc oxide;
   (d) 108 parts of carbon black, such carbon black consisting of 30 parts by weight HAF, 33 parts by weight SRF/HM, and 45 parts by weight MT carbon blacks;
   (e) 15 parts by weight trimethylolpropane trimethacrylate;
   (f) 1.1 parts by weight dicumyl peroxide;
   (g) 1 part by weight stearic acid;
   (h) 1 part by weight of N,N'-di-β naphthyl-p-phenylene di-amine; and
   (i) 2 parts by weight of poly(1,2-dihydro-2,2,4-trimethylquinoline).

* * * * *